United States Patent Office 2,845,526
Patented July 29, 1958

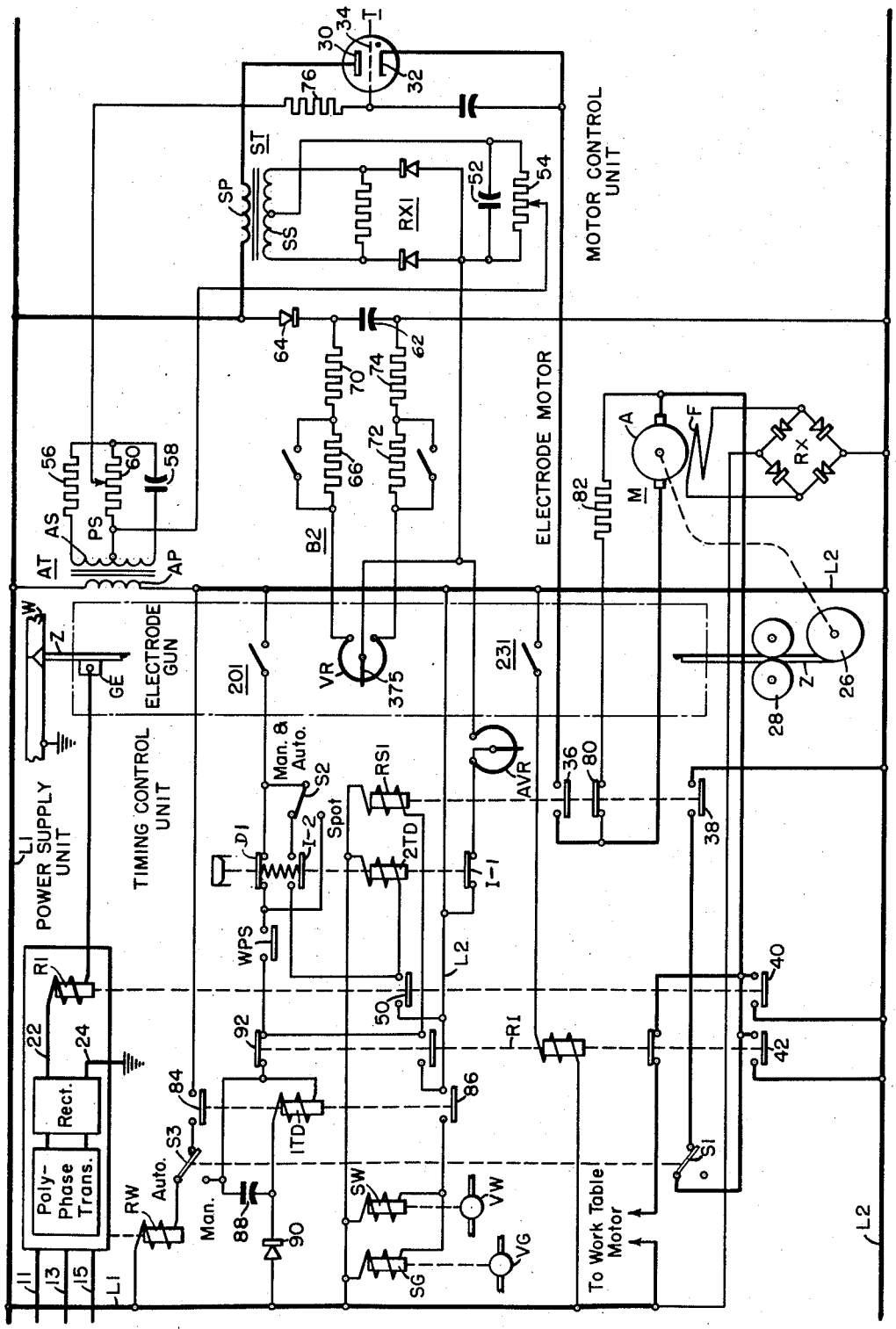

2,845,526

ARC WELDING APPARATUS

James M. Cameron, Berwick, Pa., and Alfred J. Baeslack, Clarence, N. Y., assignors to Westinghouse Electric Corporation, East Pittsburgh, Pa., a corporation of Pennsylvania Application January 3, 1956, Serial No. 556,940

11 Claims. (Cl. 219—131)

This invention relates to arc welding apparatus and has particular relation to arc-spot welding apparatus for welding with a consumable electrode in a gas shield.

Such apparatus for arc-spot welding is disclosed in an application Serial No. 550,105, filed November 30, 1955, to Fred J. Morley, Jr., Louis Manno and Austin Dixon (herein called Morley apparatus). The Morley apparatus includes provisions effective during the forming of each spot weld for depositing the electrode material during a predetermined time interval after the work has been prepurged by the shielding gas and after the time interval burning back the electrode so that its tip is within the nozzle of the gun and postpurging the work. The prepurging takes place in each case while the electrode is moving from its initial position within the nozzle to engagement with the work. The Morley apparatus is on the whole satisfactory and has been used to produce sound spot weld joints of the types disclosed in the Morley-Manno-Dixon application. But it is desirable in many situations that the timing of the actual welding operation, that is of the actual deposit of the electrode material, be more precise than can be achieved with the Morley apparatus. Also, in the interest of economy, a system of simpler structure than the Morley apparatus is desirable.

It is accordingly broadly an object of this invention to provide arc-spot welding apparatus in the operation of which the duration of the deposit of the electrode material shall be precisely timed.

Another object of this invention is to provide arc-spot welding apparatus of relatively simple and low cost structure.

It is desirable that apparatus of the type under consideration here be capable of use, not only for spot welding, but also for manual (semi automatic) and fully automatic welding and it is a further specific object of this invention to provide such apparatus which shall readily lend itself to spot welding, automatic welding or manual welding.

In accordance with this invention precision in the timing of the deposit of electrode material in spot welding is achieved by initiating the timing of the duration of the flow of electrode material into the pool in response to the flow of current between the electrode and the work. Thus, the timing starts precisely at the instant when the welding current starts to flow and any uncertainty which would be introduced by timing the movement of the electrode independently of the current flow between the electrode and the work is eliminated. Further, since the high speed movement of the electrode can start only after the welding current starts to flow, the coiling up of unconsumed electrodes on the work in the eventuality that the current fails to flow is precluded.

The prepurging in the practice of this invention is carried out generally in the same way as in the Morley apparatus during the time during which the electrode is approaching the work, but in accordance with another aspect of this invention, the speed of movement of the electrode may be set at a lower rate than during welding so that the prepurging takes place for any desired time interval within reasonable limits. Thus, a facility for adjusting the prepurging time to the demands of the operation is available. In addition, the slow speed approach to strike arc which is thus available also improves starting by minimizing spatter.

In the interest of providing apparatus of simple structure, the timing is effected in accordance with this invention, not by a 1A timer as in the Morley apparatus, but by a relay of the type that includes contacts which are opened and closed immediately on the supply of current to its coil and additional contacts that are opened a predetermined time interval after the supply of current to the coil is started. The former contacts control the network which determines the speed of the electrode. The timing is effected by the latter contacts.

Another aspect of this invention arises from the realization that the postpurging in most spot welding applications need not be of the long duration that it is in the Morley apparatus, but may take place only for the duration of the burnback. In accordance with this invention then, the postpurging and the burnback are controlled from a single relay having sets of contacts, one of which is connected to maintain the potential between the electrode and the work during the burnback interval and the other to maintain the flow of shielding gas during the postpurging interval.

In manual or semi-automatic welding the welding operation is controlled by the operator with the inching and trigger switches of the gun. In welding of this type the operator uses the inching switch to set the extent to which the electrode projects out of the gun and then brings the electrode into contact with the work by hand to strike the arc. In automatic welding the electrode is advanced through a torch or automatic gun and the work is moved relative to the gun or the gun relative to the work after a switch on a starting panel is closed. In automatic welding the electrode must be fed out of the gun at a reduced speed to strike the arc and start the weld, the gun and work must be prepurged before the welding starts and the electrode must be burned back at the end of the welding operation. Automatic inching requires that the electrode be advanced slowly to strike the arc while manual and semi-automatic operation requires that the operator move the gun forward to touch the electrode to the work. In accordance with this invention in its specific aspects the apparatus is readily converted for spot, automatic or manual welding.

The novel features considered characteristic of this invention are discussed generally above. The invention itself, both as to its organization and its method of operation together with additional objects and advantages thereof, will be understood from the following description of a preferred embodiment when read in connection with the accompanying drawing, in which the single figure is a circuit diagram of a preferred embodiment of this invention.

Description

The apparatus in accordance with this invention is a modification of the apparatus disclosed in application Serial No. 465,600, filed October 29, 1954, to Harry J. Bichsel and Alfred Baeslack (herein called Bichsel apparatus), and in practice the modification is usually effected by an attachment sold with the Bichsel apparatus. The arc-spot welding apparatus as a whole includes a power supply unit, a timing control unit, an electrode gun, an electrode motor and a motor control unit. The power supply unit is supplied from polyphase conductors 11, 13 and 15. The other components of the system are supplied from conductors L1 and L2 which may derive their power from two of the conductors 11, 13 and 15 through a suitable transformer. The arc-spot attachment which is sold with the Bichsel apparatus to adapt it or convert it for arc-spot operation usually includes a plurality of switches S1, S2 and S3 which may be set to convert the apparatus to manual, automatic or arc-spot welding. Switches S1 and S3 have two positions, one for spot and automatic and the other for manual; switch S2 has two positions, one for manual and automatic and the other for spot. Switches S1 and S3 may be ganged. In the drawing, switches S1, S2, S3 are shown in the position in which they are set for arc-spot welding.

The power supply unit may be of any type available in the art, but is preferably of the general type disclosed in Patent 2,786,160, granted May 19, 1957, to Harry J. Bichsel. This unit includes a polyphase transformer supplied from the conductors 11, 13 and 15 and a rectifier supplied from the transformer. The rectifier has a pair of output conductors 22 and 24, one of which is grounded and the other of which is connected to the electrode Z in the gun through the coil of the current relay R1. The relay R1 has normally open contacts 40 and 50. The power supply unit may be energized by actuation of a relay RW, the supply of current to which is controlled from the timing control unit. When the power supply unit is energized, potential appears between the output conductors 22 and 24.

For spot welding and for manual welding the electrode is a modification of the Miller gun similar to that in the Morley apparatus. It includes a longitudinal channel of which guide tube GE (see Miller application 465,508, filed October 29, 1954) forms a part and through which electrode Z is moved from a reel 26 to the work W. In addition, there is a starting trigger switch 201, an inching switch 231 and a variable resistor VR which may be set by a knurled knob on the gun (shown in the Miller and Morley applications but not in this application). For automatic welding, an automatic gun is used; such a gun is shown in an application Serial No. 550,106, filed November 30, 1955, to Harry J. Bichsel and assigned to Westinghouse Electric Corporation. This gun is used in cooperation with a control panel having switches and other control components for controlling the electrode Z.

The electrode motor is the same as in the Bichsel Patent 2,786,160 including an armature A and a shunt field F. The armature A is connected to drive rollers 28 which in turn drive the electrode Z. The field F is of the shunt type and is supplied from conductors L1 and L2 through a rectifier RX.

The motor control unit includes a thyratron T having an anode 30, a cathode 32 and a control electrode 34. The anode 30 is connected to the conductor L1 through the primary SP of a current transformer ST. The cathode 32 is adapted to be connected to the conductor L2 through normally open contact 36 of a starting relay RS1 in the timing control unit, the armature A, and the switch S1 and normally open contact 38 of relay RS1, or alternatively through normally open contact 40 of the current relay RI or normally open contact 42 of relay RI. The control circuit of thyratron T is completed by circuit components including network B2, network PS and rectifier RX1 which connects conductor L2 to the control electrode 34.

The control circuit of the thyratron T is supplied with a composite potential derived from the secondary SS of the transformer ST, a phase shift network PS, a biasing network B2 and the armature A. The secondary SS supplies a rectifier RX1 across the output of which a filter capacitor 52 is connected. The capacitor 52 is shunted by a voltage divider 54. The phase shift network PS includes a secondary AS of a transformer AT across which a resistor 56 and a capacitor 58 are connected in series. A variable resistor 60 is connected between the junction of the resistor 56 and the capacitor 58 and the mid tap of the secondary AS. The network B2 is supplied from a capacitor 62 connected between conductors L1 and L2 through a rectifier 64. Across the capacitor the variable resistor VR in the gun is connected through resistors 66, 70 on one side and 72 and 74 on the other. Resistors 66 and 72 may be shunted out to provide high and low electrode speed ranges.

In addition, the control circuit includes a variable resistor AVR which during the starting of each of the spot welds maintains the speed of the motor M at the lower magnitude so that the electrode Z approaches the work W at a low speed. This variable resistor AVR is connected in a branch of the control circuit including an instantaneous control I-1 of a time delay relay 2TD which is in the timing control unit.

Thyratron T thus has two control circuits, one which is effective during starting and the other which is effective during actual welding. The first extends from the control electrode 34 through a grid resistor 76, the variable resistor 60 of the phase shift network PS, the divider 54, the variable resistor AVR, the contacts I-1 of the timing relay 2TD in the timing control unit, the conductor L2, the normally open contacts 38 of the relay RS1, the switch S1, the armature A, the normally open contacts 36 of the relay RS1, to the cathode 32. The other control circuit which is effective during actual welding extends from the control electrode 32 through the grid resistor 76, the variable resistor 60 of the phase shift network PS, the divider 54, a portion of the variable resistor VR, the resistors 72 and 74, or the switch shunting 74, in series with the variable resistor VR, the conductor L2, the normally open contacts 38 of relay RS1, the switch S1 (and also the normally open contact 40 of RI), the armature A, the normally open contacts 36 of relay RS1 to the cathode 32.

The timing control unit includes a time delay relay 1TD in addition to the starting relay RS1 and the time delay relay 2TD. The timing control unit also includes solenoids SG and SW for controlling the valves VG and VW which are opened to supply shielding gas and cooling water respectively through the gun.

The starting relay RS1 has normally closed contacts 80 in addition to its normally open contacts 36 and 38. Contacts 80 close a circuit across the armature A through a braking resistor 82.

The time delay relay 2TD has in addition to the normally closed instantaneous contacts I-1 normally open instantaneous contacts I-2 and the normally closed timing contacts D1. When current is supplied to the coil of the relay 2TD, contacts I-1 open instantaneously, contacts I-2 close instantaneously and contact D1 opens after a time delay which may be set to a predetermined magnitude over a reasonable range adequate for producing welds of different durations.

The time delay relay 1TD includes a pair of normally open contacts 84 and 86. The coil of this relay is shunted by a capacitor 88. When current is supplied to the coil of the relay the contacts 84 and 86 close instantaneously. On the interruption of the supply of current to the coil the capacitor 88 which was charged while the current was supplied to the coil discharges, maintaining the relay actuated for a predetermined interval. This interval may be of the order of ¼ second to ½ second.

The coil of the relay RS1 is connected in a circuit extending from the conductor L1 through the coil through a pressure switch WPS which is closed when the water pressure is adequate, the normally closed timing contacts D1 of the relay 2TD, the trigger switch 201 of the gun to the conductor L2. The coil of the relay 2TD is adapted to be connected in a circuit extending from the conductor L1 through the coil, normally open contacts 50 of relay RI to conductor L2. The contact I-2 of relay 2TD is adapted to lock in the coil 2TD when it is closed in a circuit extending from the conductor L1 through the coil, the contact I-2, the switch S2, the trigger switch 201 to the conductor L2. The coil of the relay 1TD is adapted to be connected in a circuit from the conductor L1 through a rectifier 90, the coil, normally closed contacts 92 of the relay RI, the pressure switch WPS, normally closed contacts D1, the trigger switch 201 to the conductor L2. The relay RW is adapted to be connected between the conductors L1 and L2 through contacts 84 of the relay 1TD and switch S3. The solenoids SG and SW are adapted to be connected in parallel between the conductors L1 and L2 through the other contacts 86 of the relay 1TD.

*Standby spot*

In the standby condition of the apparatus, conductors 11, 13, 15, L1 and L2 are energized. Switch 201 is open so that relays RS1, 1TD and RW are deenergized. The motor circuit is then open and the braking resistor 82 is connected across the armature A of the motor. Since relay RW is deenergized there is no potential between the output conductors 22 and 24 of the power supply unit and relay RI is deenergized. Further, since the relay 1TD is deenergized, the solenoids SG and SW are deenergized and the flow of gas and water to the gun is blocked. Since relay RI is deenergized, relay 2TD is deenergized, the branch circuit through resistor AVR is closed by the contacts I-1 and the timing contacts D1 are closed. If the water pressure is adequate, switch WPS is closed. Since the motor circuit is open, thyratron T is deenergized but the capacitor of the biasing network BL is charged so that there is potential across the resistor AVR and also across the resistor VR. The potential across the resistor AVR is such that the thyratron T if energized would have a low conductivity.

*Operation spot*

When the apparatus is to be used the electrode Z is threaded into the gun preferably with the aid of the inching switch 231 and the relay RI. Thereafter, the gun is placed with the nozzle in the proper position on the work K and the trigger 201 is closed. The closing of the trigger has two principal effects. The relay RS1 is energized and the timing delay relay 1TD is energized. The actuation of the relay RS1 immediately opens the braking circuit across the armature A and closes the armature circuit of the motor. At this time the thyratron T is controlled from the variable resistor AVR and its conductivity is low so that the motor speed is low. The motor then advances the electrode Z to the work at the low speed determined by the setting of the resistor AVR.

The actuation of the relay 1TD causes the relay RW and the solenoids SG and SW to be energized. The relay RW causes potential to be supplied between the output terminals 22 and 24 of the power supply unit. The energization of the valves SG and SW at the same time permits gas and water to flow through the gun. The gas flows while the electrode Z is advancing towards the work and purges the gun channels of moisture and oxygen on the work and prepares a shield for the arc. The electrode Z now continues to advance towards the work W until it contacts the work, and an arc is ignited between the work and the electrode. The current flow between the electrode Z and the work W energizes relay R1 which is actuated and in turn through contacts 50 actuates relay 2TD. Contact I-2 closes immediately, locking in the relay 2TD independently of the normally open, now-closed contacts 50 of the relay RI. This prevents the relay 2TD from starting another timing cycle when at the end of its timing cycle relay RI is deenergized.

In addition, by the actuation of relay 2TD contact I-1 is opened so that the low speed branch including the resistor AVR is disconnected from the control circuit of thyratron T and the thyratron is now controlled from the variable resistor VR. The current flow through the thyratron T is now increased and the motor M operates at the normal welding speed supplying the electrode Z at this speed. This operation continues and as it continues the relay 2TD times out.

When the relay 2TD has timed out, contacts D1 open. This has two principal effects. The relay RS1 is deenergized and the relay 1TD is deenergized. The interruption of the supply of current through the coil of the relay RS1 causes this relay to drop out immediately and the braking circuit of the motor M is closed and the supply circuit to the motor M is opened. The motor is then stopped. On the interruption of the supply of current to the coil of the relay 1TD the relay remains actuated for the time interval required by the capacitor 88 to discharge through the coil. During this time interval relay RW remains actuated and solenoids SG and SW remain energized. Power then still continues to be supplied between the electrode Z and the work W and the electrode Z is burned back to the desired extent. In addition, shielding gas continues to flow through the nozzle and there is post purging so that oxidation of the hot molten metal at the spot being welded is prevented.

At the end of the time interval for which the relay 1TD is set, this relay drops out and its contacts 84 and 86 are opened to stop the supply of power from the power supply unit and the supply of gas and water. The weld is now at an end. To reset the apparatus for a second weld the switch 201 must be opened to permit relay 2TD to drop out and reset its contacts.

The magnitude of the braking resistor 82 should be coordinated with the timing interval of relay 1TD to control the length of electrode at the conclusion of the weld. The resistor 82 determines the time interval during which the motor and the movement of electrode Z is stopped and the relay 1TD should maintain relay RW actuated long enough after the electrode Z stops moving so that the burn back leaves the tip of electrode Z in the desired position.

*Manual*

For manual welding switches S1, S2 and S3 are set to the manual positions. Relay RW is connected by S3 to be controlled by the trigger switch 201 directly and not through the relay 1TD so that power for welding is immediately available on closing of switch 201. In manual welding, contact 38 is disconnected from the circuit so that the operation of the motor is controlled from contact 40 and is responsive to the welding current only. Welding current starts to flow when the operator touches the electrode Z to the work W by operating the inch button 231. When the welding current starts to flow and relay R1 is is actuated, 2TD is actuated, immediately opening contact I-1 and disconnecting resistor AVR from the motor control unit so that the motor operates at full speed. The opening of contact D1 of relay 2TD has no effect since it is shunted out by S2.

When the switch 201 is opened, relay RS1 is deenergized opening the armature circuit and the anode-cathode circuit of thyratron T and stopping the motor. In addition, relay RW is deenergized and the welding current is interrupted.

*Automatic*

With the switches S1, S2 and S3 set for automatic the connection of the apparatus is the same as for spot welding except that the delay contact D1 of relay 2TD which times the spots is shunted out so that the welding is continuous. In this case a switch on the automatic panel connected similarly to 201 is closed to start the weld and remains closed. Relay RS1 is then immediately actuated to cause the electrode to approach the work at reduced speed and at the same time contacts 84 and 86 are closed to supply power and to prepurge the gun and work. The arc is struck when the electrode touches the work actuating relay RI and then the welding continues until the start switch is opened. Once the switch is opened relay RS1 is deenergized to stop the motor. Relay 1TD is also deenergized but contacts 84 and 86 remain closed for a short time so that the electrode is burned back.

Conclusion

While a preferred embodiment of this invention has been disclosed herein, many modifications thereof are feasible. The invention therefore is not to be restricted except insofar as is necessitated by the spirit of the prior art.

We claim as our invention:

1. Arc-spot welding apparatus for welding work with a consumable electrode in a shielding gas comprising in combination means cooperative with said electrode for advancing said electrode to said work, means to be connected to said electrode for impressing a potential between said electrode and said work, an arc being initiated between said electrode and work when said electrode engages said work with a potential impressed therebetween, means cooperative with said electrode for supplying a shielding gas in the region of said arc, first timing means, second timing means, means connected to said advancing means for actuating said advancing means; means connected to said impressing means for actuating said impressing means substantially simultaneously with the actuation of said advancing means, means connected to said gas supplying means for actuating said supplying means substantially simultaneously with the actuation of said advancing means, said second timing means being connected to said actuating means for said impressing means, and said supplying means so as to interrupt the actuation of said impressing means and said supplying means on the timing out of said second timing means, means connected to said first timing means and responsive to the current flow between said electrode and said work for causing the timing out of said first timing means so long as said current flows, means connected to said second timing means and responsive to the timing out of said first timing means for causing the timing out of said second timing means, and means responsive to the timing out of said first timing means for interrupting the actuation of said advancing means.

2. Arc-spot welding apparatus for welding work with a consumable electrode in a shielding gas comprising in combination means cooperative with said electrode for advancing said electrode to said work, means to be connected to said electrode for impressing a potential between said electrode and said work, an arc being initiated between said electrode and said work when said electrode engages said work with a potential impressed therebetween, first timing means, second timing means, means connected to said advancing means for actuating said advancing means; means connected to said impressing means for actuating said impressing means substantially simultaneously with the actuation of said advancing means, said second timing means being connected to said actuating means for said impressing means so as to interrupt the actuation of said impressing means on the timing out of said second timing means, means connected to said first timing means and responsive to the current flow between said electrode and said work for causing the timing out of said first timing means so long as said current flows, means connected to said second timing means and responsive to the timing out of said first timing means for causing the timing out of said second timing means, and means responsive to the timing out of said first timing means for interrupting the actuation of said advancing means.

3. Apparatus for arc-spot welding work with a consumable electrode comprising a motor connected to said electrode for advancing said electrode to said work, means connected to said electrode for impressing a potential between said electrode and said work, an arc being initiated between said electrode and said work when said electrode engages said work with potential between said electrode and work, a relay having an energizing coil, a first normally closed contact capable of being opened after current has been flowing through said coil during a predetermined time interval and a second normally closed contact capable of being opened substantially immediately on the flow of current through said coil, a circuit connected to said impressing means for actuating said impressing means, said circuit including said first contact and being capable of being opened on the opening of said first contact, a circuit connected to said motor to energize said motor and including a branch network maintained closed by said second contact, said network while closed maintaining the speed of said motor at a lower magnitude, and means to be actuated by the current flow between said electrode and said work for supplying energizing current to said coil.

4. Apparatus for arc-spot welding work with a consumable electrode comprising in combination, a motor connected to said electrode for advancing said electrode to said work, means connected to said electrode for impressing a potential between said electrode and said work, an arc being initiated between said electrode and said work when said electrode engages said work with potential between said electrode and work, a relay having an energizing coil, a first normally closed contact capable of being opened after current has been flowing through said coil during a predetermined time interval and a second normally closed contact capable of being opened substantially immediately on the flow of current through said coil, a circuit connected to said impressing means for actuating said impressing means, said circuit including said first contact and being capable of being opened on the opening of said first contact, a circuit connected to said motor to energize said motor and including a branch network maintained closed by said second contact, said network while closed maintaining the speed of said motor at a lower magnitude, means to be actuated by the current flow between said electrode and said work for supplying energizing current to said coil, and means responsive to the flow of energizing current through said coil for maintaining said energizing current in said coil after the flow of current between said electrode and said work has stopped.

5. Apparatus for arc-spot welding work with a consumable electrode comprising a motor connected to said electrode for advancing said electrode to said work, means connected to said electrode for impressing a potential between said electrode and said work, an arc being initiated between said electrode and said work when said electrode engages said work with a potential between said electrode and work, a relay having an energizing coil, a first normally closed contact capable of being opened after current has been flowing through said coil during a predetermined time interval and a second normally closed contact capable of being opened substantially immediately on the flow of current through said coil, a circuit connected to said impressing means for actuating said impressing means, said circuit including said first contact and being capable of being opened on the opening of said first contact, a circuit connected to said motor to energize said motor and including a branch network maintained closed by said second contact, said network while closed maintaining the speed of said motor at a lower magnitude, means connected to said motor circuit to be energized by current flow by the closing of an additional circuit for closing said motor circuit, said additional circuit including said first contact and being capable of being opened when said first contact is opened, and means to be actuated by the current flow between said electrode and said work for supplying energizing current to said coil.

6. Apparatus for arc welding work with a consumable electrode in a shield of gas including means connected to said electrode for impressing a potential between said electrode and said work to produce an arc therebetween, means cooperative with said electrode for supplying said gas, a time delay relay having a first normally open contact, a second normally open contact and a coil, said contacts being closed substantially immediately on the supply of current to said coil and being opened a predetermined time interval after the flow of current through said coil has been interrupted, a first circuit including said first contact when closed and connected to said impressing means to actuate said impressing means, and a second circuit including said second contact when closed and connected to said supplying means to actuate said supplying means.

7. Arc welding apparatus for welding work with a consumable electrode including means to be connected to said electrode and work when actuated for impressing a potential between said electrode and said work to produce a welding arc therebetween, first actuating means to be energized by current flow therethrough and when energized actuating said impressing means to impress said potential, means to be connected to said electrode when actuated for advancing said electrode toward said work, second actuating means to be energized by current flow therethrough connected to said advancing means and when energized actuating said advancing means, third actuating means responsive to the flow of current between said electrode and said work connected to said advancing means when energized for actuating said advancing means, first timing means connected to said first actuating means, said first timing means when energized carrying said first actuating means to be energized substantially immediately and when deenergized permitting said first actuacting means to be energized after a predetermined interval, second timing means connected to said first timing means, said second timing means when actuated causing said first timing means when energized to be deenergized a predetermined interval after said second timing means is actuating, means connected to said first timing means for energizing said first timing means, means connected to said second timing means for actuating said second timing means, manually switch means having a first position, a second position and a third position, and means connecting said switch means to said first and second timing means and said first, second and third actuating means, so that in said first position the operation of said first actuating means is timed as aforesaid by said first and second timing means and said advancing means is actuated by said second and third actuating means, in said second position the actuation of said second timing means is precluded and the operation of said first actuating means is timed only by said first timing means and said advancing means is actuated by said second and third actuating means and in said third position energization of said first timing means and actuation of said second timing means is precluded and operation of said first actuating means is controlled independently of said timing means and said advancing means is actuated only from said third actuating means.

8. Arc welding apparatus for welding work with a consumable electrode including means to be connected to said electrode and work and when actuated impressing a potential therebetween to produce a welding arc therebetween, means to be connected to said electrode and when actuated advancing said electrode toward said work, manual selectively actuable switch means having a first position, a second position and a third position, first actuating means including said switch means in said first position connected to said impressing means when operated for actuating said impressing means, second actuating means including said switch means in said first position connected to said advancing means when operated for actuating said advancing means substantially simultaneously with said impressing means, said second actuating means including first timing means connected to said advancing means for interrupting the actuation of said advancing means a first predetermined time interval after said last-named actuation is started and said first actuating means including said first timing means and second timing means cooperative with said first timing means and connected to said impressing means for interrupting the impressing of said potential a second predetermined time interval after the interruption of the actuation of said advancing means, third actuating means including said switch means in said second position connected to said advancing means when operated for actuating said advancing means, said advancing means continuing actuated so long as said third means is operated, fourth actuating means including said switch means in said second position connected to said impressing means when operated actuating said impressing means simultaneously with said advancing means, said fourth means including said second timing means, said second timing means interrupting the actuation of said impressing means said second timing interval after interruption of the operation of said fourth means, fifth actuating means including said switch means in said third position and connected to said impressing means and when operated and so long as it continues to be operated actuating and maintaining actuated said impressing means, and sixth actuating means including said switch means in said third position and connected to said advancing means and when operated and so long as it remains operated actuating and maintaining actuated said advancing means.

9. An arc-spot welding apparatus for welding work with a consumable electrode by an arc between said electrode and work and including means for advancing said electrode, a timing means for timing the duration of each weld, means to be connected to said electrode and work and responsive only to current conducted between said electrode and work as distinguished from the potential between said electrode and work, and start switch means for starting a welding operation, the advancing means of said apparatus being actuated immediately on actuation of said switch means advancing said electrode towards said work but the timing out of the timing means being initiated by said current responsive means on the flow of current between said electrode and work after said electrode contacts said work and the timing out continuing so long as said current flows and the current continuing for the duration of the timing interval.

10. Arc welding apparatus for welding work with a consumable electrode including means to be connected to said electrode and work and when actuated impressing a potential therebetween to produce a welding arc therebetween, means to be connected to said electrode and when actuated advancing said electrode toward said work, manual selectively actuable switch means having a first position, a second position and a third position, first actuating means including said switch means in said first position connected to said impressing means when operated for actuating said impressing means, second actuating means including said switch means in said first position connected to said advancing means when operated for actuating said advancing means substantially simultaneously with said impressing means, said second actuating means including first timing means connected to said advancing means for interrupting the actuation of said advancing means a first predetermined time interval after said last-named actuation is started and said first actuating means including said first timing means and second timing means cooperative with said first timing means and connected to said impressing means for interrupting the impressing of said potential a second predetermined time interval after the interruption of the actuation of said advancing means, said first timing means being responsive to the current between the electrode and work for causing said first timing means to time out said first interval while said current is flowing, third actuating means including said switch means in said second position connected to said advancing means when operated for actuating said advancing means, said advancing means continuing actuated so long as said third means is operated, fourth actuating means including said switch means in said second position connected to said impressing means when operated actuating said impressing means simultaneously with said advancing means, said fourth means including said second timing means, said second timing means interrupting the actuation of said impressing means said second timing interval after interruption of the operation of said fourth means, fifth actuating means including said switch means in said third position and connected to said impressing means and when operated and so long as it continues to be operated actuating and maintaining actuated said impressing means, and sixth actuating means including said switch means in said third position and connected to said advancing means and when operated and so long as it remains operated actuating and maintaining actuated said advancing means.

11. Apparatus for arc welding work with a consumable electrode in a shield of gas including means connected to said electrode for advancing said electrode toward said work, means connected to said electrode for impressing a potential between said electrode and said work to produce an arc therebetween, means cooperative with said electrode for supplying said gas, a time delay relay having a first normally open contact, a second normally open contact and a coil, said contacts being closed substantially immediately on the supply of current to said coil and being opened a predetermined time interval after the flow of current through said coil has been interrupted, a first circuit including said first contact when closed and connected to said impressing means to actuate said impressing means, a second circuit including said second contact when closed and connected to said supplying means to actuate said supplying means, and means connected to said coil and to said advancing means for energizing said coil and actuating said advancing means substantially simultaneously.

References Cited in the file of this patent
UNITED STATES PATENTS

| | | |
|---|---|---|
| 1,701,372 | Jefts | Feb. 5, 1929 |
| 2,152,785 | Blankenbuehler | Apr. 4, 1939 |
| 2,504,868 | Muller et al. | Apr. 18, 1950 |
| 2,510,207 | Behnke et al. | June 6, 1950 |
| 2,517,739 | Tyrner | Aug. 8, 1950 |
| 2,550,495 | Pilia | Apr. 24, 1951 |
| 2,635,165 | Spice et al. | Apr. 4, 1953 |
| 2,776,361 | Essig | Jan. 1, 1957 |
| 2,806,127 | Hackman | Sept. 10, 1957 |